United States Patent
Yoshisaka et al.

(10) Patent No.: US 10,415,680 B2
(45) Date of Patent: Sep. 17, 2019

(54) DIFFERENTIAL APPARATUS

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 141 days.

(21) Appl. No.: 15/645,146

(22) Filed: Jul. 10, 2017

(65) Prior Publication Data

US 2018/0010677 A1    Jan. 11, 2018

(30) Foreign Application Priority Data

Jul. 11, 2016  (JP) .................................. 2016-137047

(51) Int. Cl.
| | |
|---|---|
| *F16H 48/08* | (2006.01) |
| *F16H 48/24* | (2006.01) |
| *F16H 48/30* | (2012.01) |
| *F16D 27/09* | (2006.01) |
| *F16H 48/34* | (2012.01) |
| *F16H 48/40* | (2012.01) |

(52) U.S. Cl.
CPC ............ *F16H 48/08* (2013.01); *F16D 27/09* (2013.01); *F16H 48/24* (2013.01); *F16H 48/30* (2013.01); *F16H 48/34* (2013.01); *F16H 48/40* (2013.01)

(58) Field of Classification Search
CPC .......... F16H 48/08; F16H 48/24; F16H 48/34; F16H 48/40; F16H 2048/085
See application file for complete search history.

(56) References Cited

U.S. PATENT DOCUMENTS

| | | | | |
|---|---|---|---|---|
| 1,332,535 | A |  | 3/1920 | Baker |
| 4,715,248 | A | * | 12/1987 | Gant ....................... F16H 48/08 |
| | | | | 192/56.31 |
| 5,890,989 | A | * | 4/1999 | Yamazaki .............. B60K 23/08 |
| | | | | 180/247 |

(Continued)

FOREIGN PATENT DOCUMENTS

JP         2015-87015         5/2015

*Primary Examiner* — David R Morris
(74) *Attorney, Agent, or Firm* — Oblon, McClelland, Maier & Neustadt, L.L.P.

(57) ABSTRACT

A differential apparatus includes: a differential mechanism that distributes an input driving force to a pair of side gears so as to allow differential motion therebetween; a differential case that accommodates the differential mechanism; and a clutch mechanism that transmits the driving force between the differential case and pinion shafts of the differential mechanism. The clutch mechanism includes: a slide member that is movable relative to the pinion shafts of the differential mechanism in the axial direction of the differential case and is non-rotatable relative thereto in the differential case; and an actuator that applies an axial moving force to the slide member. The slide member has on one end portion a first meshing portion. The differential case includes a disc-shaped first case member and a bottomed-cylindrical second case member that accommodates the differential mechanism. The second case member has a second meshing portion facing the first meshing portion.

5 Claims, 8 Drawing Sheets

(56) References Cited

U.S. PATENT DOCUMENTS

| | | | | |
|---|---|---|---|---|
| 6,015,361 A * | 1/2000 | Yamazaki | ............... | F16H 48/08 |
| | | | | 180/247 |
| 6,027,422 A * | 2/2000 | Yamazaki | ............... | B60K 23/04 |
| | | | | 192/53.36 |
| 6,827,661 B2 * | 12/2004 | Fusegi | ................... | B60K 23/04 |
| | | | | 475/150 |
| 6,945,895 B2 * | 9/2005 | Fusegi | ................... | B60K 23/04 |
| | | | | 180/247 |
| 6,959,799 B2 * | 11/2005 | Fusegi | ................... | F16H 48/08 |
| | | | | 192/84.6 |
| 6,966,863 B2 * | 11/2005 | Teraoka | ................. | F16H 48/24 |
| | | | | 475/154 |
| 7,074,150 B2 * | 7/2006 | Fusegi | ................... | B60K 23/04 |
| | | | | 475/150 |
| 7,081,065 B2 * | 7/2006 | Sudou | .................... | F16H 48/08 |
| | | | | 475/230 |
| 7,354,374 B2 * | 4/2008 | Teraoka | ................. | F16H 48/08 |
| | | | | 475/231 |
| 9,476,460 B2 * | 10/2016 | Seidl | ....................... | F16D 13/46 |
| 9,797,495 B2 * | 10/2017 | Inose | ....................... | F16D 11/00 |
| 9,878,615 B2 * | 1/2018 | Kamitani | ............. | B60K 23/04 |
| 9,970,525 B2 * | 5/2018 | Zaers | ....................... | F16H 48/08 |
| 10,173,525 B2 * | 1/2019 | Kamitani | ............. | B60K 17/165 |
| 10,227,001 B2 * | 3/2019 | Yoshisaka | ............. | B60K 23/04 |
| 10,259,319 B2 * | 4/2019 | Yoshisaka | ............. | B60K 23/04 |
| 10,267,400 B2 * | 4/2019 | Kamitani | ............. | F16D 27/09 |
| 2002/0132694 A1 | 9/2002 | Okazaki | | |
| 2002/0155913 A1 * | 10/2002 | Fusegi | ................... | B60K 23/04 |
| | | | | 475/150 |
| 2003/0162622 A1 * | 8/2003 | Fusegi | ................... | B60K 23/04 |
| | | | | 475/231 |
| 2003/0184171 A1 * | 10/2003 | Teraoka | ................. | F16H 48/24 |
| | | | | 310/80 |
| 2004/0142786 A1 * | 7/2004 | Fusegi | ................... | F16H 48/08 |
| | | | | 475/231 |
| 2004/0166985 A1 * | 8/2004 | Sudou | .................... | F16H 48/08 |
| | | | | 475/230 |
| 2005/0009662 A1 * | 1/2005 | Sudou | .................... | F16H 48/08 |
| | | | | 475/231 |
| 2005/0277510 A1 * | 12/2005 | Fusegi | ................... | B60K 23/04 |
| | | | | 475/231 |
| 2006/0052207 A1 * | 3/2006 | Teraoka | ................. | F16H 48/08 |
| | | | | 475/231 |
| 2008/0026900 A1 * | 1/2008 | Gotoh | .................... | F16H 48/05 |
| | | | | 475/220 |
| 2009/0192007 A1 * | 7/2009 | Sudou | .................... | F16H 48/08 |
| | | | | 475/230 |
| 2015/0114786 A1 | 4/2015 | Seidl | | |
| 2016/0273637 A1 * | 9/2016 | Zaers | ....................... | F16H 48/08 |
| 2016/0341294 A1 * | 11/2016 | Inose | ....................... | F16D 11/00 |
| 2017/0219023 A1 * | 8/2017 | Haupt | .................... | F16H 48/08 |
| 2017/0291491 A1 * | 10/2017 | Kamitani | ............. | B60K 23/04 |
| 2017/0291492 A1 * | 10/2017 | Kamitani | ............. | B60K 17/165 |
| 2017/0292596 A1 * | 10/2017 | Kamitani | ............. | F16D 27/09 |
| 2017/0297428 A1 * | 10/2017 | Inose | ..................... | F16D 27/112 |
| 2018/0038422 A1 * | 2/2018 | Yoshisaka | ............. | F16D 11/14 |
| 2018/0043774 A1 * | 2/2018 | Yoshisaka | ............. | B60K 23/04 |
| 2018/0099562 A1 * | 4/2018 | Yoshisaka | ............. | B60K 23/04 |
| 2018/0245677 A1 * | 8/2018 | Yoshisaka | ............. | F16H 48/08 |
| 2018/0361850 A1 * | 12/2018 | Yoshisaka | ............. | B60K 23/04 |

* cited by examiner

DIFFERENTIAL APPARATUS

INCORPORATION BY REFERENCE

The disclosure of Japanese Patent Application No. 2016-137047 filed on Jul. 11, 2016 including the specification, drawings and abstract, is incorporated herein by reference in its entirety.

BACKGROUND OF THE INVENTION

1. Field of the Invention

The present invention relates to a differential apparatus that outputs an input driving force from a pair of output members so as to allow differential motion therebetween.

2. Description of Related Art

Conventionally, differential apparatuses each of which outputs an input driving force from a pair of output members so as to allow differential motion therebetween have been used as vehicle differential apparatuses, for example. Some of differential apparatuses of this type can cut off transmission of the input driving force to the output members. For example, see Japanese Patent Application Publication No. 2015-87015 (JP 2015-87015 A).

A differential apparatus described in JP 2015-87015 A includes: a differential mechanism having two differential gears supported by a shaft-like journal and two sideshaft gears; a differential case (housing) that accommodates the differential mechanism; a carrier element that is rotatably accommodated in the differential case; a second clutch part that is fixed to the carrier element; a first clutch part that can mesh with the second clutch part; and an actuator that moves the first clutch part in an axial direction with respect to the second clutch part. To the differential case, a driving force is input from a driving gear that is fixed on the outer-peripheral surface thereof by welding or bolting. In the carrier element, two bores are formed. The journal is inserted into the bores, and is fixed therein by a securing pin.

The first clutch part has an annular portion and a plurality of axial projections that protrude from the annular portion in the axial direction. On the distal end of each axial projection, a toothed ring segment that meshes with the second clutch part is formed. The annular portion of the first clutch part is arranged outside the differential case, and the axial projections are inserted into axial holes that are formed in a side wall of the differential case. By this configuration, the first clutch part is coupled to the differential case so as to be movable relative thereto in the axial direction and non-rotatable relative thereto.

When the first clutch part is axially moved toward the second clutch part by activation of the actuator, the toothed ring segments of the axial projections mesh with the second clutch part, and thus the carrier element rotates integrally with the differential case. Consequently, the driving force input to the differential case from the driving gear is transmitted to the differential gear via the first clutch part, the second clutch part, and the carrier element.

When the actuator is deactivated, the first clutch part is moved apart from the second clutch part by a return spring and meshing therebetween is released, whereby the carrier element becomes rotatable relative to the differential case. Consequently, transmission of the driving force from the differential case to the differential mechanism is cut off.

In the differential apparatus described in JP 2015-87015 A, the driving force input to the differential case is transmitted to the first clutch part via the side wall of the differential case. However, the toothed ring segments are formed on the distal ends of the axial projections in the first clutch part, and in order for the first clutch part to have sufficient strength, the size of the axial projections needs to be increased. This requires increase in size of the axial holes that are formed in the side wall and into which the axial projections are inserted, which makes it difficult to obtain the strength from a structural viewpoint. In other words, in order to obtain the strength for the side wall and to transmit a sufficient driving force to the first clutch part, thickness of the differential case needs to be increased, which increases weight and size.

SUMMARY OF THE INVENTION

It is an object of the present invention to provide a differential apparatus that can connect and disconnect transmission of driving force and can prevent increase in weight and size of a differential case.

A differential apparatus according to one aspect of the present invention includes: a differential mechanism that distributes a driving force input to an input member to a pair of output members so as to allow differential motion therebetween; a differential case that accommodates the differential mechanism; and a clutch mechanism that transmits the driving force between the differential case and the input member of the differential mechanism. The clutch mechanism includes a slide member and an actuator. The slide member is disposed in the differential case so as to be movable relative to the differential mechanism in a central axis direction along a rotation axis of the differential case and so as to be non-rotatable relative thereto. The actuator is configured to apply a moving force to the slide member in the central axis direction. The slide member has a first meshing portion having a plurality of meshing teeth formed on one end portion thereof in the central axis direction. The differential case includes a first case member having a disc shape and a second case member having a bottomed cylindrical shape having a cylindrical portion that accommodates the differential mechanism and a bottom portion that extends inward from one end portion of the cylindrical portion in an axial direction. The second case member has a second meshing portion having a plurality of meshing teeth that face the first meshing portion in the central axis direction. In response to activation and deactivation of the actuator, the state of the differential apparatus switches between a coupled state and an uncoupled state. The coupled state is a state in which the first meshing portion and the second meshing portion mesh with each other in a circumferential direction and the slide member and the differential case are coupled together so as to be non-rotatable relative to each other. The uncoupled state is a state in which the slide member and the differential case are rotatable relative to each other.

With the differential apparatus according to the aspect described above, a differential apparatus that can connect and disconnect transmission of driving force while preventing increase in weight and size of the differential case can be provided.

BRIEF DESCRIPTION OF THE DRAWINGS

The foregoing and further features and advantages of the invention will become apparent from the following descrip

DETAILED DESCRIPTION OF EMBODIMENTS

A first embodiment of the present invention will now be described with reference to FIG. 1 to FIG. 5B.

Figure 1:
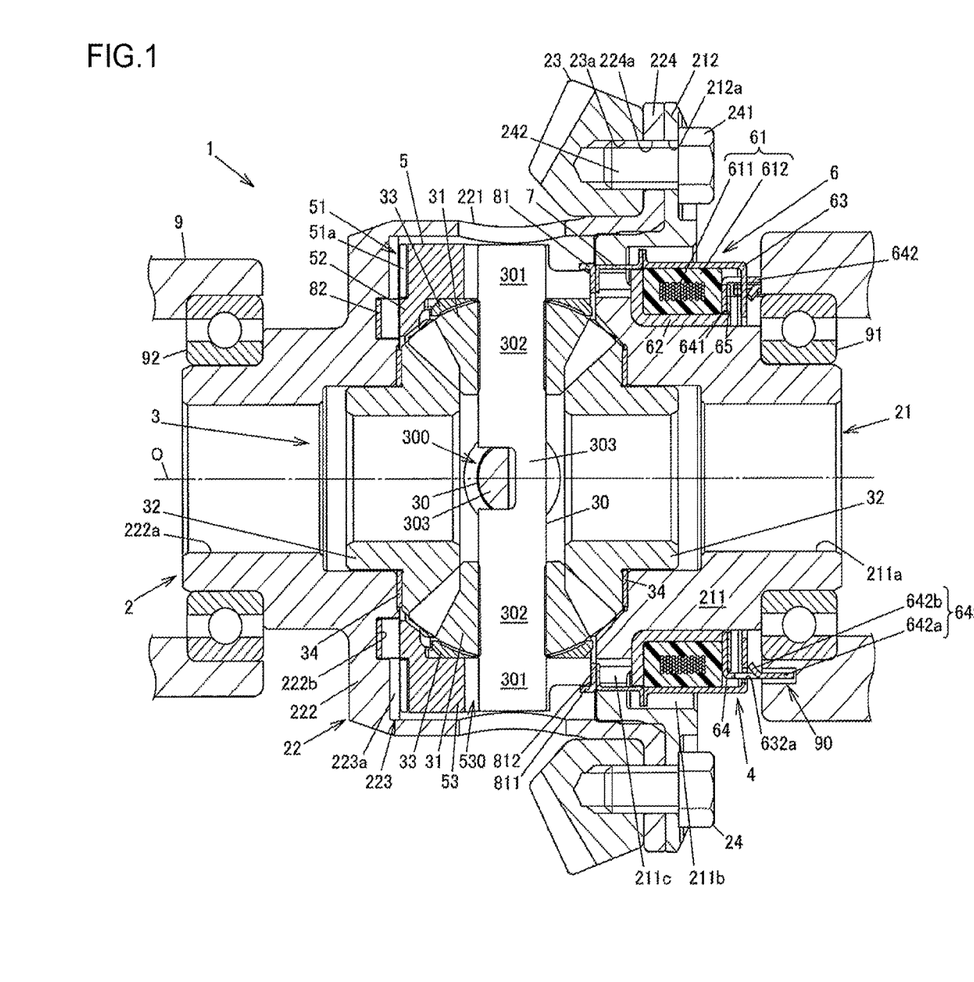
- FIG. 1 is a sectional view illustrating a configuration example of a differential apparatus according to a first embodiment of the present invention.
Figure 2:
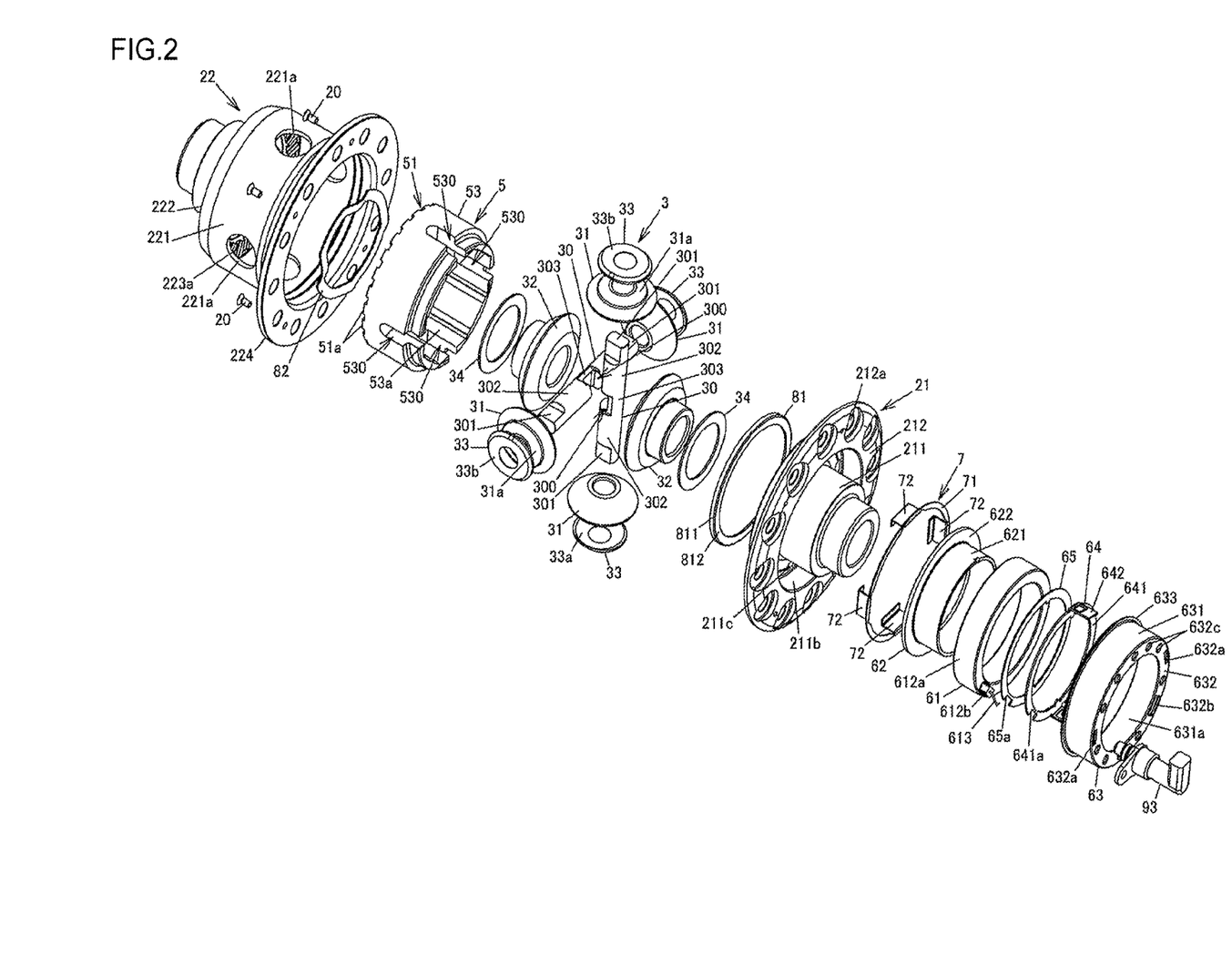
FIG. 2 is an exploded perspective view of the differential apparatus according to the first embodiment.
Figure 3:
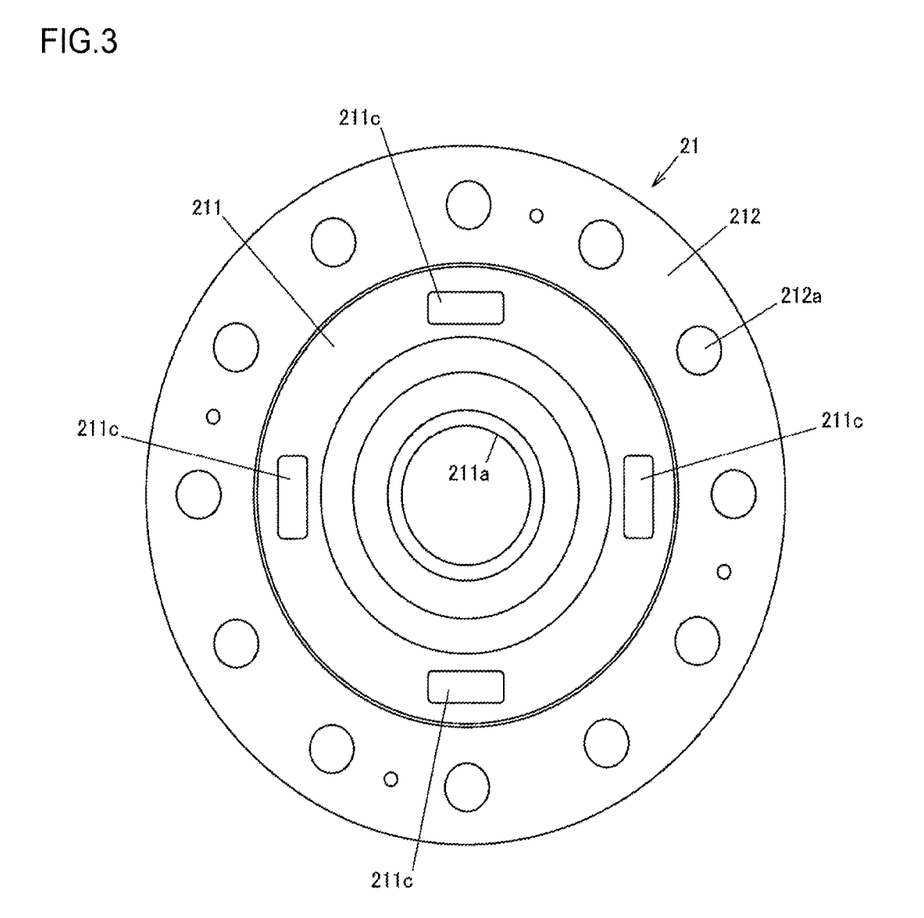
FIG. 3 is a plan view of inner surfaces of a first case member of a differential case when viewed in the axial direction.
Figure 4:
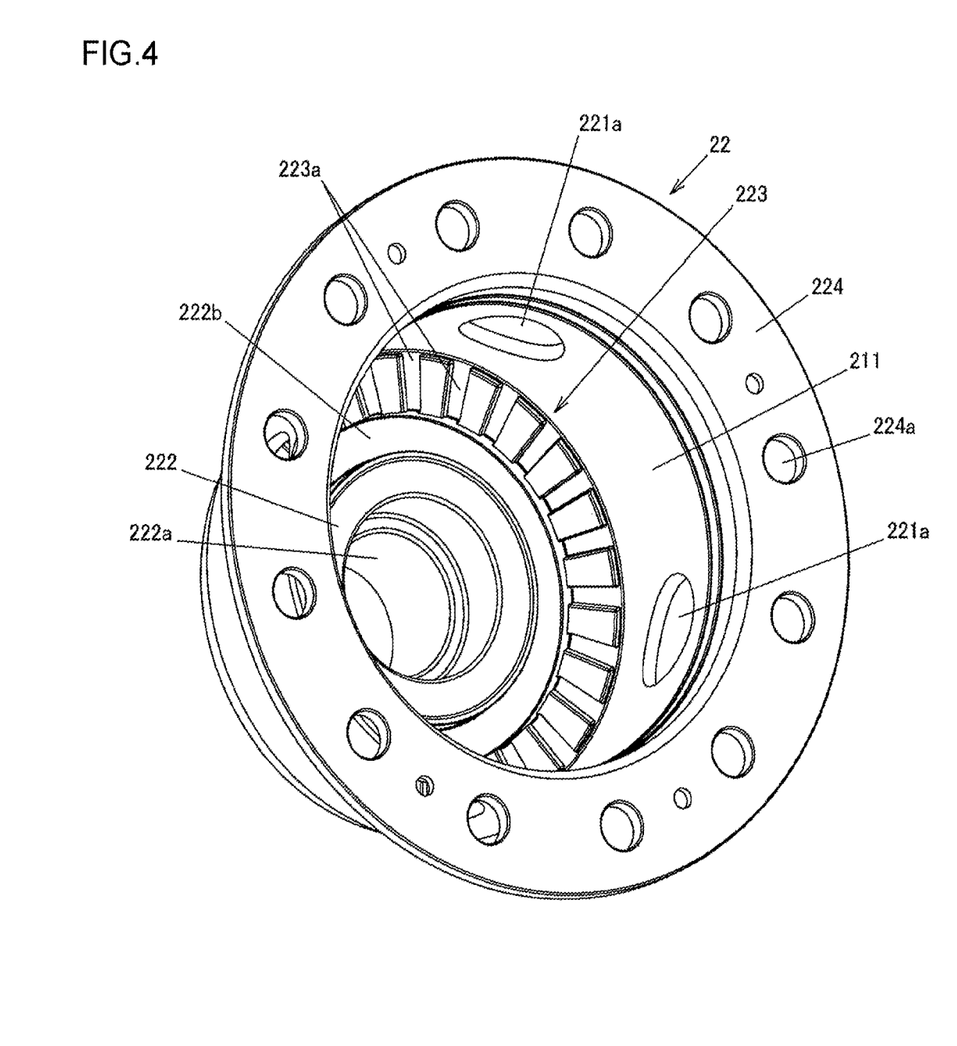
FIG. 4 is a perspective view illustrating a second case member of the differential case.

FIG. 1 is a sectional view illustrating a configuration example of a differential apparatus according to the first embodiment of the present invention. FIG. 2 is an exploded perspective view of the differential apparatus. FIG. 3 is a plan view of inner surfaces of a first case member of a differential case when viewed in the axial direction. FIG. 4 is a perspective view of a second case member of the differential case.

This differential apparatus 1 is used to distribute a driving force of a driving source such as an engine of a vehicle to a pair of output axles so as to allow differential motion therebetween. More specifically, the differential apparatus 1 according to the present embodiment is used as a differential apparatus that is mounted on a four-wheel-drive vehicle having a pair of right and left main drive wheels (e.g., front wheels) to which the driving force of the driving source is constantly transmitted and a pair of right and left auxiliary drive wheels (e.g., rear wheels) to which the driving force of the driving source is transmitted depending on traveling conditions, and that distributes the driving force to the right and left auxiliary drive wheels. When the driving force is transmitted only to the main drive wheels, the vehicle is in a two-wheel drive mode. When the driving force is transmitted to the main drive wheels and the auxiliary drive wheels, the vehicle is in a four-wheel drive mode. In the four-wheel drive mode, the differential apparatus 1 distributes the input driving force to right and left drive shafts on the auxiliary drive wheels side.

The differential apparatus 1 includes a differential case 2 that is rotatably supported by a differential carrier 9 fixed to a vehicle body with a pair of bearings 91 and 92 interposed therebetween, a differential mechanism 3 that is accommodated in the differential case 2, and a clutch mechanism 4 that can be engaged and disengaged to transmit the driving force between the differential case 2 and the differential mechanism 3. Into the differential case 2, lubricant for lubricating the differential mechanism 3 is introduced.

The differential mechanism 3 includes a pinion shaft 30 as an input member, a plurality of (four) pinion gears 31 that are supported so as to be rotatable about a rotation axis O of the differential case 2, and a pair of side gears 32 as a pair of output members. The pinion gears 31 and the pair of side gears 32 are bevel gears and mesh with each other with their gear axes being orthogonal to each other. To the pair of side gears 32, the right and left drive shafts are each coupled so as to be non-rotatable relative thereto. On each of the pinion gears 31 and the side gears 32, a plurality of gear teeth are formed. However, illustration of these gear teeth is omitted in FIG. 2.

The differential mechanism 3 distributes the driving force input to the pinion shaft 30 to the pair of side gears 32 so as to allow differential motion therebetween. In the present embodiment, the differential mechanism 3 has a pair of pinion shafts 30, two pinion gears 31 out of four pinion gears 31 are supported via one of the pinion shafts 30, and remaining two pinion gears 31 are supported via the other of the pinion shafts 30.

As depicted in FIG. 2, each pinion shaft 30 has a pair of engaged portions 301 that engage with a slide member 5 of the clutch mechanism 4, a pair of pinion-gear support portions 302 that are inserted into the pinion gears 31, and a coupling portion 303 that couples the pair of pinion-gear support portions 302, and is formed in a shaft shape as a whole. The pair of engaged portions 301 are formed on both end portions of the pinion shaft 30, and the coupling portion 303 is formed in an axially central portion of the pinion shaft 30. The pair of pinion-gear support portions 302 are each formed between the corresponding one of the pair of engaged portions 301 and the coupling portion 303, and support the pinion gears 31.

The pair of pinion shafts 30 mesh with each other at the axial central portions thereof. Specifically, the coupling portion 303 in one of the pinion shafts 30 is fitted into a recess 300 formed between the pair of pinion-gear support portions 302 in the other of the pinion shafts 30, and the coupling portion 303 in the other of the pinion shafts 30 is fitted into a recess 300 formed between the pair of pinion-gear support portions 302 in the one of the pinion shafts 30. The pair of pinion shafts 30 are orthogonal to each other when viewed along the rotation axis O of the differential case 2.

The clutch mechanism 4 includes the slide member 5 that is movable in a central axis direction along the rotation axis O of the differential case 2, an actuator 6 that applies a moving force to the slide member 5 in the central axis direction, a pressing member 7 disposed between the slide member 5 and the actuator 6, a washer 81 interposed between the pressing member 7 and the slide member 5, and a wave washer 82 as a biasing member that biases the slide member 5 toward the actuator 6. The slide member 5 is disposed inside the differential case 2. The actuator 6 is disposed outside the differential case 2. The pressing member 7 transmits the moving force of the actuator 6 to the slide member 5. The slide member 5 is pressed by the pressing member 7 to move in the central axis direction.

The slide member 5 has a cylindrical shape the central axis of which corresponds to the rotation axis O of the differential case 2, and is disposed so as to be movable relative to the pair of pinion shafts 30 of the differential mechanism 3 in the central axis direction along the rotation axis O of the differential case 2 and so as to be non-rotatable relative thereto. The slide member 5 is formed by forging steel, and integrally has a first meshing portion 51 having a plurality of meshing teeth 51a formed on one end portion in the central axis direction, an annular inner-rib portion 52 formed so as to protrude inward from the first meshing portion 51, and a cylindrical portion 53 in which engaging portions 530 engaged with the pinion shafts 30 in the circumferential direction are formed. The first meshing portion 51 meshes with a second meshing portion 223 (described later) formed on the differential case 2 in the circumferential direction. An axial end surface of the inner-rib portion 52 is in contact with the wave washer 82, and receives a biasing force of the wave washer 82. The engaging portions 530 are formed as grooves passing through between inner- and outer-peripheral surfaces of the cylindrical portion 53 and extending in the central axis direction of the slide member 5.

With the engaging portions 530, the engaged portions 301 formed on both end portions of each pinion shaft 30 are engaged. The engaged portions 301 of the pinion shafts 30 are engaged with the engaging portions 530 of the slide member 5, and thus the slide member 5 is movable relative to the pinion shafts 30 in the central axis direction along the rotation axis O and is non-rotatable relative thereto. The pinion gears 31 can rotate (revolve) together with the slide member 5 about the rotation axis O of the differential case 2. In the present embodiment, because the engaged portions 301 formed on both end portions of each of the pair of pinion shafts 30 are engaged with the slide member 5, four engaging portions 530 are formed in the cylindrical portion 53.

Between an inner-peripheral surface 53a of the cylindrical portion 53 of the slide member 5 and back surfaces 31a of each of the pinion gears 31, washers 33 are disposed. In each washer 33, the inner surface 33a thereof that faces the back surface 31a of the corresponding pinion gear 31 has a shape of a partial spherical surface, and the outer surface 33b thereof that faces the inner-peripheral surface 53a of the cylindrical portion 53 of the slide member 5 has a shape of a flat surface. When the pinion gear 31 rotates (revolves) about the corresponding pinion shaft 30, the back surface 31a of the pinion gear 31 slides on the inner surface 33a of the washer 33. When the slide member 5 is moved in the central axis direction with respect to the pinion shaft 30, the inner-peripheral surface 53a of the cylindrical portion 53 of the slide member 5 slides on the outer surface 33b of the washer 33. In the inner-peripheral surface 53a of the cylindrical portion 53, portions that slide on the outer surfaces 33b of the respective washers 33 are each formed in a shape of a flat surface.

The pressing member 7 has an annular-ring portion 71 that is disposed outside the differential case 2 and a plurality of protruding pieces 72 that extend parallel to the rotation axis O of the differential case 2 from the annular-ring portion 71. In the present embodiment, the pressing member 7 has four protruding pieces 72. The pressing member 7 is formed by stamping a steel plate, and distal-end portions (end portions on the side opposite to the base-end portions on the annular-ring portion 71 side) of the protruding pieces 72 are bent inward. Between the cylindrical portion 53 of the slide member 5 and the distal-end portions of the protruding pieces 72, a washer 81 having an L-shaped cross section is disposed. The washer 81 has a tubular portion 811 having a cylindrical shape and a disc portion 812 that extends inward from one end portion of the tubular portion 811 in the axial direction, and the tubular portion 811 is fitted onto the cylindrical portion 53 of the slide member 5. The distal-end portions of the protruding pieces 72 are in contact with the disc portion 812 of the washer 81.

The actuator 6 includes an annular electromagnet 61 having a coil winding 611 and a mold resin portion 612 that molds the coil winding 611, a yoke 62 that serves as a magnetic path for magnetic flux of the electromagnet 61 generated when the coil winding 611 is energized, and an armature 63 that is in sliding-contact with the mold resin portion 612 so as to be guided in the rotation axis O of the differential case 2. The cross section of the mold resin portion 612 along the rotation axis O is rectangular. With magnetic force generated when the coil winding 611 is energized, the armature 63 moves the slide member 5 in a direction in which the first meshing portion 51 meshes with the second meshing portion 223 of the differential case 2. The first meshing portion 51 of the slide member 5 is caused to mesh with the second meshing portion 223 by the moving force of the actuator 6 that is transmitted via the pressing member 7.

To the coil winding 611 of the electromagnet 61, an exciting current is supplied from a control device (not depicted) through an electric wire 613 that is introduced out of a boss portion 612b formed on the mold resin portion 612. The actuator 6 is activated when the exciting current is supplied to the coil winding 611. The yoke 62, made of soft magnetic metal such as low-carbon steel, integrally has a cylindrical portion 621 that covers the inner-peripheral surface of the mold resin portion 612 from inside and a collar portion 622 that protrudes outward from one end portion of the cylindrical portion 621 in the axial direction to cover an axial end surface of the mold resin portion 612. The bore diameter of the cylindrical portion 621 of the yoke 62 is formed slightly larger than the outside diameter of a portion of the differential case 2 that faces the inner-peripheral surface of the cylindrical portion 621.

At an end portion of the cylindrical portion 621 of the yoke 62 on the side opposite to the collar portion 622, an anti-rotation member 64 and a stopper ring 65 are disposed. This anti-rotation member 64 engages with the yoke 62 so as to be non-rotatable relative thereto, and this stopper ring 65 prevents the electromagnet 61 and the anti-rotation member 64 from coming out of the yoke 62. The anti-rotation member 64, made of non-magnetic metal such as austenitic stainless steel, integrally has an annular portion 641 that is disposed at the outer periphery of the cylindrical portion 621 of the yoke 62 and a pair of protruding portions 642 that protrude in the axial direction from the annular portion 641 at two locations in the circumferential direction.

The anti-rotation member 64 prevents the yoke 62 from rotating, with the pair of protruding portions 642 engaging with recesses 90 formed on the differential carrier 9. The pair of protruding portions 642 are disposed through insertion holes 632a that are formed in the armature 63 in the axial direction, thereby preventing the armature 63 from rotating with respect to the yoke 62 and the differential carrier 9. Each protruding portion 642 has a flat plate portion 642a that is disposed through the corresponding insertion hole 632a of the armature 63 and a locking projection 642b that is disposed closer to the corresponding recess 90 of the differential carrier 9 than the insertion hole 632a is and restricts axial movement of the armature 63 with respect to the yoke 62. In the present embodiment, the locking projection 642b is formed by cutting and bending up part of the plate portion 642a.

The stopper ring 65 is disposed in such a position that the annular portion 641 of the anti-rotation member 64 is sandwiched between the stopper ring 65 and the electromagnet 61, and is fixed to the cylindrical portion 621 of the yoke 62 by welding, for example. In the stopper ring 65 and the annular portion 641 of the anti-rotation member 64, notches 65a and 641a into which the boss portion 612b formed on the mold resin portion 612 of the electromagnet 61 is fitted are formed, respectively.

The armature 63, made of soft magnetic metal such as low-carbon steel, integrally has an annular outer-ring portion 631 that is disposed at the outer periphery of the electromagnet 61, a side-plate portion 632 that is formed so as to protrude inward from one end portion of the outer-ring portion 631 in the axial direction, and a flange portion 633 that is formed so as to protrude outward from the other end portion of the outer-ring portion 631 in the axial direction. The outer-ring portion 631 has a cylindrical shape that covers the electromagnet 61 from the outer peripheral side. The side-plate portion 632 faces the electromagnet 61 and the stopper ring 65 in the axial direction. The flange portion 633 is in contact with the annular-ring portion 71 of the pressing member 7.

The armature 63 is supported by the electromagnet 61, with the inner-peripheral surface 631a of the outer-ring portion 631 being in contact with the outer-peripheral surface 612a of the mold resin portion 612. When the armature 63 moves in the axial direction, the inner-peripheral surface 631a of the outer-ring portion 631 slides on the outer-peripheral surface 612a of the mold resin portion 612.

In the side-plate portion 632 of the armature 63, two insertion holes 632a through which the pair of protruding portions 642 of the anti-rotation member 64 are each disposed, a through hole 632b through which the boss portion 612b of the electromagnet 61 passes, and a plurality of (10 in the example depicted in FIG. 2) oil holes 632c through which lubricant is caused to flow are formed.

The differential case 2 includes a first case member 21 having a disc shape and a second case member 22 having a bottomed cylindrical shape. The first case member 21 covers and seals an opening of the second case member 22. Between the pair of side gears 32 in the differential mechanism 3 and the first case member 21 and the second case member 22, washers 34 each having an annular plate shape are each disposed.

As depicted in FIG. 4, the second case member 22 integrally has a cylindrical portion 221 that accommodates therein the differential mechanism 3 and the slide member 5, a bottom portion 222 that extends inward from one end portion of the cylindrical portion 221 in the axial direction, the second meshing portion 223 that meshes with the first meshing portion 51 of the slide member 5, and a flange portion 224 that extends outward from the other end portion of the cylindrical portion 221 in the axial direction. In the cylindrical portion 221, a plurality of oil holes 221a through which lubricant is caused to flow are formed. In the bottom portion 222, a shaft insertion hole 222a and an annular groove 222b that accommodates the wave washer 82 are formed. Into this shaft insertion hole 222a, one of the drive shafts that is coupled to one side gear 32 out of the pair of side gears 32 so as to be non-rotatable relative thereto is inserted.

The second meshing portion 223, having a plurality of meshing teeth 223a formed at regular intervals along the circumferential direction, is formed on the bottom portion 222 side of the second case member 22. In the present embodiment, the meshing teeth 223a are formed so as to protrude in the axial direction from the inner surface of the bottom portion 222. The wave washer 82 biases the slide member 5 in a direction of separating the slide member 5 apart from the bottom portion 222 of the second case member 22.

The first case member 21 integrally has a disc portion 211 that faces the bottom portion 222 of the second case member 22 in the axial direction and a flange portion 212 that is caused to abut the flange portion 224 of the second case member 22. The flange portion 212 of the first case member 21 and the flange portion 224 of the second case member 22 are fastened together by a plurality of screws 20. In the disc portion 211, a shaft insertion hole 211a is formed, into which the other of the drive shafts that is coupled to the other side gear 32 out of the pair of side gears 32 is inserted so as to be non-rotatable relative thereto. In the disc portion 211, an annular groove 211b and through holes 211c are formed. This annular groove 211b is formed so as to be recessed in the axial direction from an outer surface on the side opposite to the surface facing the bottom portion 222 of the second case member 22. These through holes 211c communicate with the annular groove 211b and pass through the disc portion 211 in the axial direction.

In the annular groove 211b of the first case member 21, each of the electromagnet 61, the yoke 62, and the armature 63 of the actuator 6 is partially accommodated. Through the through holes 211c of the first case member 21, the protruding pieces 72 of the pressing member 7 are disposed. The annular-ring portion 71 of the pressing member 7 is disposed in the annular groove 211b.

To the differential case 2, driving force is input from an annular ring gear 23 (see FIG. 1) that is fixed to the flange portions 212 and 224 of the first and second case members 21 and 22. The ring gear 23 is fixed to an outer periphery of the cylindrical portion 221 of the second case member 22 on the flange portion 224 side. In the present embodiment, by a plurality of fastening bolts 24 that are each inserted into a plurality of bolt insertion holes 212a formed in the flange portion 212 of the first case member 21 and a plurality of bolt insertion holes 224a formed in the flange portion 224 of the second case member 22, the ring gear 23 is fixed to the differential case 2 so as to rotate integrally therewith. The head portion 241 of each fastening bolt 24 comes into contact with the flange portion 212 of the first case member 21, and the shaft portion 242 thereof on which an external thread is formed is screwed through the corresponding bolt insertion holes 212a and 224a into the corresponding screw hole 23a of the ring gear 23.

In response to activation and deactivation of the actuator 6, the state of the differential apparatus 1 switches between a coupled state and an uncoupled state. The coupled state is a state in which the first meshing portion 51 and the second meshing portion 223 mesh with each other in the circumferential direction and the slide member 5 and the differential case 2 are coupled together so as to be non-rotatable relative to each other. The uncoupled state is a state in which the slide member 5 and the differential case 2 are rotatable relative to each other.

Figure 5A:
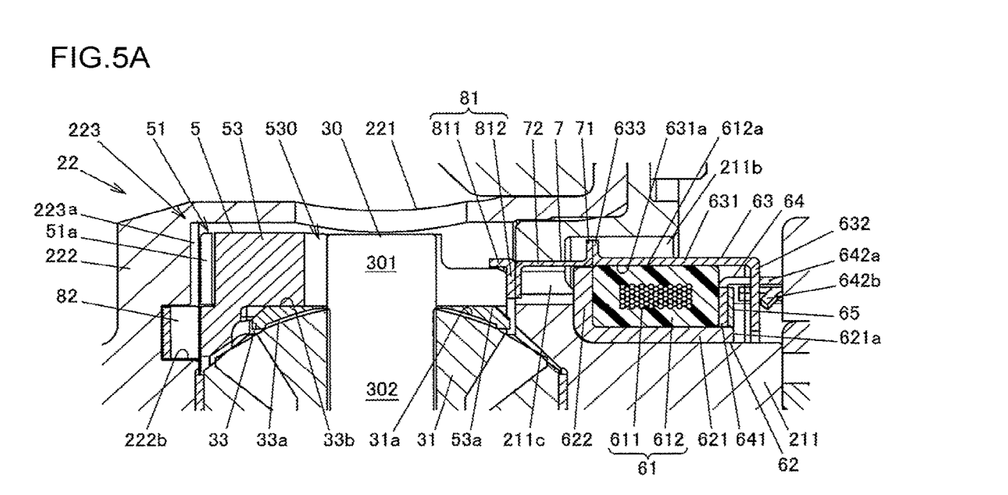
FIG. 5A is a partial sectional view illustrating the differential apparatus during deactivation of an actuator.
Figure 5B:
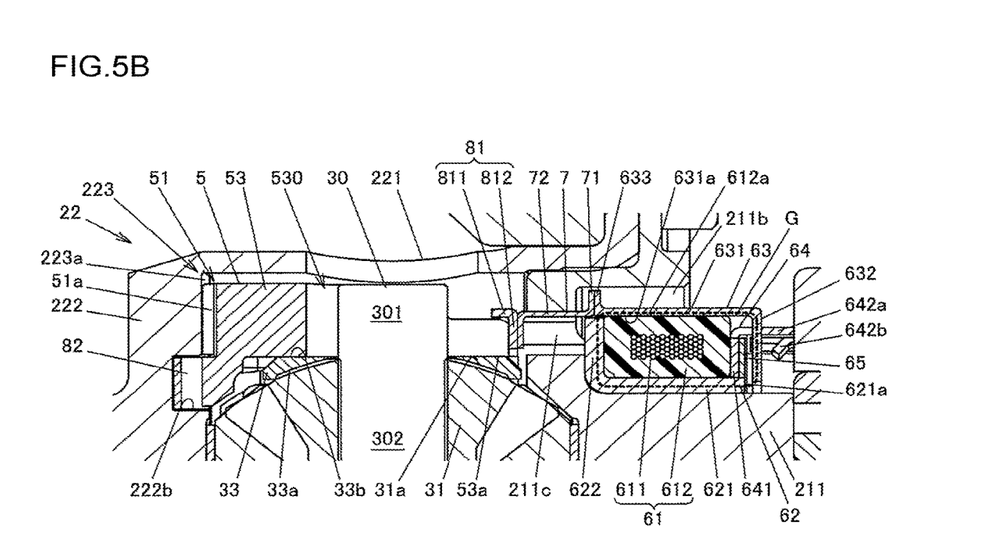
FIG. 5B is a partial sectional view of the differential apparatus during activation of the actuator.

FIG. 5A is a partial sectional view illustrating the differential apparatus 1 during deactivation of the actuator 6. FIG. 5B is a partial sectional view of the differential apparatus 1 during activation of the actuator 6.

During deactivation of the actuator 6 in which the exciting current is not supplied to the coil winding 611 of the electromagnet 61, the slide member 5 is moved toward the disc portion 211 of the first case member 21 by restoring force of the wave washer 82, whereby meshing between the first meshing portion 51 and the second meshing portion 223 is released. When the electromagnet 61 is not energized, the armature 63 is brought back to an initial position apart from the bottom portion 222 by the restoring force of the wave washer 82 transmitted via the slide member 5, the washer 81, and the pressing member 7.

During this deactivation of the actuator 6, the differential case 2 and the slide member 5 can rotate relative to each other, and thus transmission of the driving force from the differential case 2 to the differential mechanism 3 is cut off. Accordingly, the driving force input from the ring gear 23 to the differential case 2 is not transmitted to the drive shafts, and thus the vehicle is in the two-wheel drive mode.

When the exciting current is supplied to the coil winding 611 of the electromagnet 61, magnetic flux is generated in a magnetic path G indicated by the dashed line in FIG. 5B. Accordingly, by the magnetic force of the electromagnet 61, the armature 63 is moved in the axial direction such that the side-plate portion 632 of the armature 63 approaches the axial end surface 621a of the cylindrical portion 621 of the yoke 62. Consequently, the pressing member 7 presses the slide member 5 toward the bottom portion 222 of the second case member 22, so that the first meshing portion 51 and the second meshing portion 223 mesh with each other. Specifically, the pressing member 7 receives the moving force of the armature 63 from the annular-ring portion 71 and, with this moving force, presses the slide member 5 toward the bottom portion 222 of the second case member 22. The position of the armature 63 is detected by a position sensor 93 (see FIG. 2) that is fixed to the differential carrier 9.

When the first meshing portion 51 and the second meshing portion 223 mesh with each other, the driving force input from the ring gear 23 to the second case member 22 of the differential case 2 is transmitted to the drive shafts via the slide member 5, the pair of pinion shafts 30, four pinion gears 31, and the pair of side gears 32 of the differential mechanism 3, and thus the vehicle is in the four-wheel drive mode.

When switching the state of actuator 6 from the deactivated state to the activated state, the control device supplies to the electromagnet 61 the exciting current having a magnitude sufficient to quickly move the slide member 5. Subsequently, when determining that the first meshing portion 51 and the second meshing portion 223 are meshing with each other, the control device reduces the current value of the exciting current to a relatively small current value that is at least sufficient to maintain the meshing between the first meshing portion 51 and the second meshing portion 223. This can reduce power consumption.

According to the first embodiment described above, the differential case 2 includes the first case member 21 and the second case member 22, and the second case member 22 integrally has the flange portion 224 to which the ring gear 23 is fastened and the second meshing portion 223 with which the first meshing portion 51 of the slide member 5 meshes. By this configuration, the driving force input from the ring gear 23 is transmitted to the slide member 5 only via the second case member 22, and is then transmitted from the slide member 5 to the pinion shafts 30 of the differential mechanism 3. Thus, the disc portion 211 of the first case member 21, in which the through holes 211c are formed through which the protruding pieces 72 of the pressing member 7 are disposed, is not included in the transmission path of the driving force. This makes it possible to connect and disconnect transmission of the driving force by axial movement of the slide member 5 while preventing increase in weight and size of the differential case 2.

Figure 6:
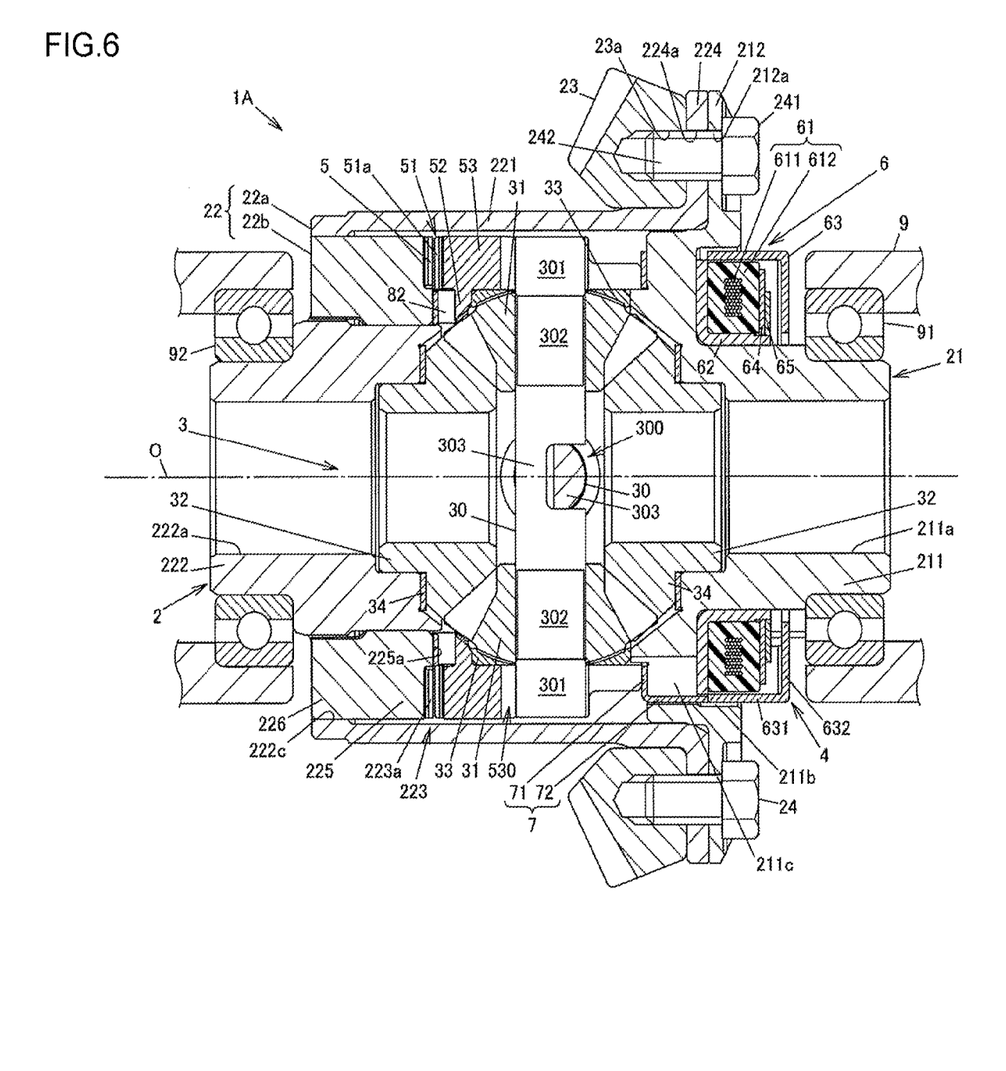
FIG. 6 is a sectional view illustrating a configuration example of a differential apparatus according to a second embodiment.
Figure 7:
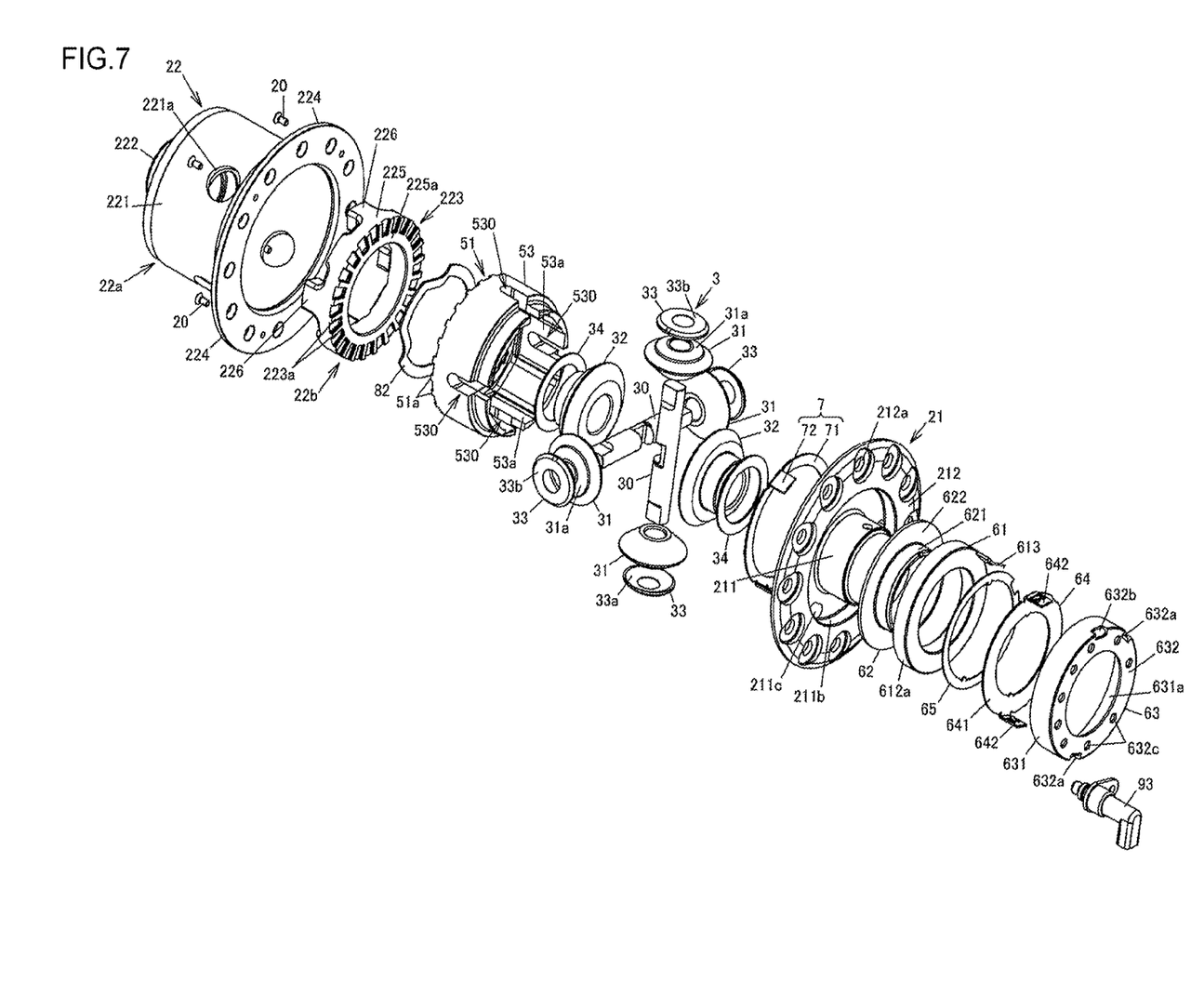
FIG. 7 is an exploded perspective view of the differential apparatus according to the second embodiment.
Figure 8:
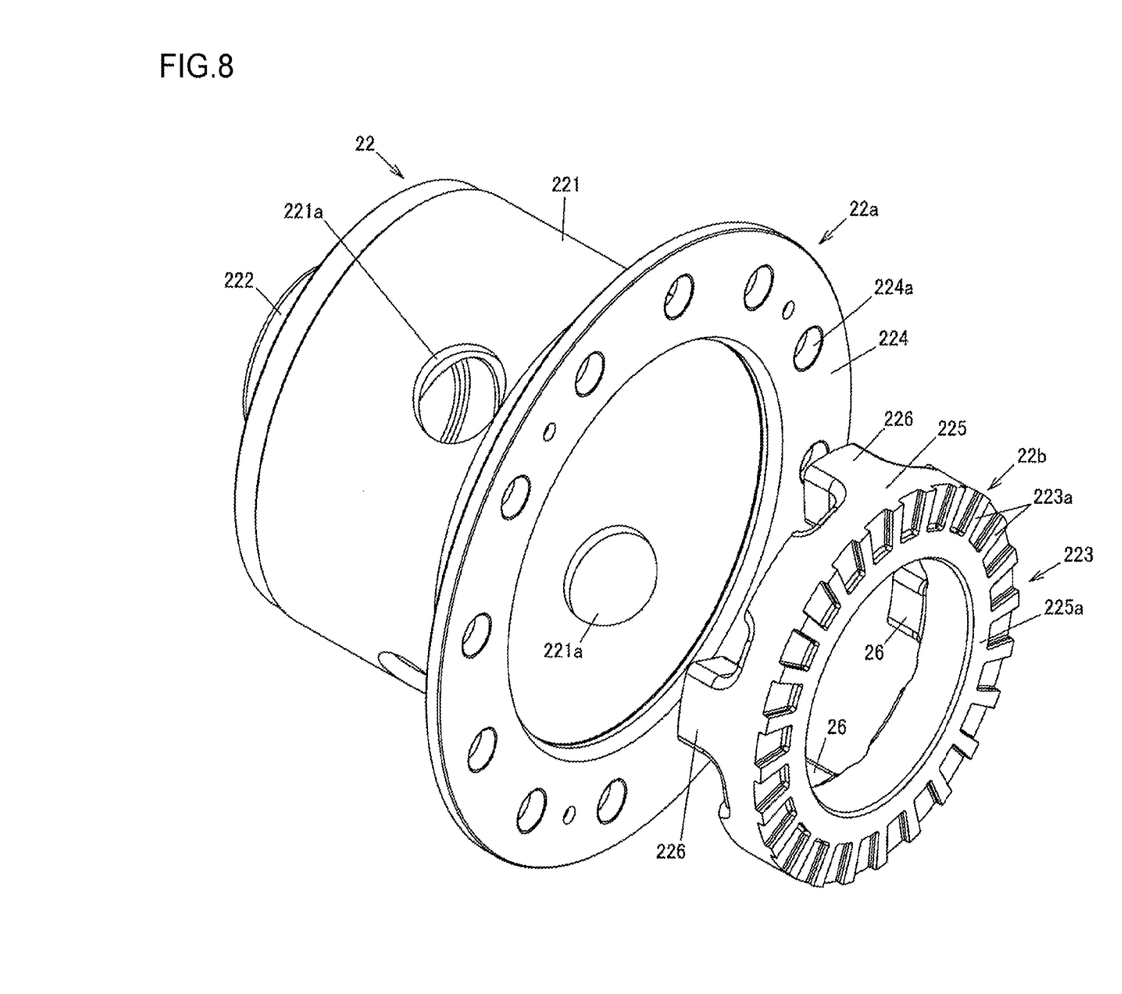
FIG. 8 is a perspective view of a second case member of the differential apparatus according to the second embodiment.

The following describes a second embodiment of the present invention with reference to FIG. 6 to FIG. 8. A differential apparatus 1A according to the present embodiment is different from the differential apparatus according to the first embodiment mainly in the configuration of the second case member 22 of the differential case 2, and is substantially the same in the other configurations. In view of this, in the second embodiment, members or other components that have substantially the same functions as those in the first embodiment are designated by the same numerals as the numerals used in FIG. 1 to FIG. 5B, and duplicate description is omitted.

FIG. 6 is a sectional view illustrating the differential apparatus 1A according to the second embodiment. FIG. 7 is an exploded perspective view of the differential apparatus 1A. FIG. 8 is a perspective view illustrating the second case member 22 of the differential apparatus 1A.

The first embodiment has been described in which the second case member 22 integrally has the cylindrical portion 221, the bottom portion 222, and the meshing teeth 223a of the second meshing portion 223. However, in the present embodiment, the second case member 22 includes a combination of a main body 22a that integrally has the cylindrical portion 221 and the bottom portion 222 and a separate body 22b that is separate from the main body 22a and has the second meshing portion 223. In the main body 22a, a plurality of through holes 222c (see FIG. 6) that pass through the bottom portion 222 in the axial direction parallel to the rotation axis O are formed.

The separate body 22b integrally has an annular-ring portion 225, a plurality of foot shafts 226 as engaging portions extending from the annular-ring portion 225 in the axial direction, and the second meshing portion 223 having the meshing teeth 223a that are formed on an axial end portion of the annular-ring portion 225 on the side opposite to the foot shafts 226. In the present embodiment, on the separate body 22b, four foot shafts 226 are formed so as to extend parallel to each other along the axial direction. Each foot shaft 226 is fitted into the corresponding through hole 222c of the main body 22a, and engages with the bottom portion 222 so as to be non-rotatable relative thereto. Thus, the separate body 22b is fastened to the main body 22a so as to be non-rotatable relative thereto. The foot shafts 226 of the separate body 22b are closely fitted into the through holes 222c so as to eliminate backlash in the circumferential direction, for example.

In the first embodiment, the pressing member 7 has the annular-ring portion 71 and the protruding pieces 72, and the protruding pieces 72 are configured to press the slide member 5 via the washer 81. The pressing member 7 according to the present embodiment has the annular-ring portion 71 and the protruding pieces 72 similarly to the first embodiment. However, the annular-ring portion 71 is in contact with an end portion of the cylindrical portion 53 of the slide member 5, and the distal-end portions of the protruding pieces 72 are in contact with an end portion of the outer-ring portion 631 of the armature 63.

In the first embodiment, the wave washer 82 is accommodated in the annular groove 222b formed in the bottom portion 222 of the second case member 22. However, in the present embodiment, the wave washer 82 is disposed between the annular-ring portion 225 of the separate body 22b and the inner-rib portion 52 of the slide member 5. On the annular-ring portion 225 on the inner side with respect to the second meshing portion 223, a contact surface 225a with which the wave washer 82 is in contact is formed.

The differential apparatus 1A according to the present embodiment configured as described above operates similarly to the differential apparatus 1 according to the first embodiment, and outputs the driving force input from the ring gear 23 from the pair of side gears 32 of the differential mechanism 3 in a manner capable of being engaged and disengaged.

According to the present embodiment, in addition to the functions and effects described in the first embodiment, machining of the second meshing portion 223 can be facilitated because the second case member 22 includes the main body 22a and the separate body 22b in combination, and the second meshing portion 223 is formed on the axial end portion of the separate body 22b. Although the through holes 222c are formed in the bottom portion 222 of the main body 22a, the size of the through holes 222c can be set to a size in which the minimum strength required for the foot shafts 226 can be obtained. Thus, sufficient strength of bottom portion 222 can be obtained, and the strength of the second case member 22 can be prevented from decreasing. Furthermore, the main body 22a and the separate body 22b can be fastened together by a fastening method, such as bolting or welding, that enables transmission of the driving force. In this case, the strength can be more reliably prevented from decreasing.

The present invention has been described above based on the first and second embodiments, but the respective embodiments do not limit the invention according to the claims. It should be noted that all combinations of characteristics described in the embodiments are not always essential for measures for solving problems by the invention. The present invention may be optionally modified for implementation within the scope not departing from the gist thereof.

What is claimed is:

1. A differential apparatus comprising:
a differential mechanism that distributes a driving force input to an input member to a pair of output members so as to allow differential motion therebetween;
a differential case that accommodates the differential mechanism; and
a clutch mechanism that transmits the driving force between the differential case and the input member of the differential mechanism, wherein
the clutch mechanism includes a slide member and an actuator, the slide member being disposed in the differential case so as to be movable relative to the differential mechanism in a central axis direction along a rotation axis of the differential case and the actuator being configured to apply a moving force to the slide member in the central axis direction,
the slide member has a first meshing portion having a plurality of meshing teeth formed on one end portion thereof in the central axis direction,
the differential case includes a first case member having a disc shape and a second case member having a bottomed cylindrical shape having a cylindrical portion that accommodates the differential mechanism and a bottom portion that extends inward from one end portion of the cylindrical portion in the central axis direction,
the second case member has a second meshing portion having a plurality of meshing teeth that face the first meshing portion in the central axis direction, and
in response to activation and deactivation of the actuator, the state of the differential apparatus switches between a coupled state and an uncoupled state, the coupled state being a state in which the first meshing portion and the second meshing portion mesh with each other in a circumferential direction and the slide member and the differential case are coupled together so as to be non-rotatable relative to each other, and the uncoupled state being a state in which the slide member and the differential case are rotatable relative to each other,
wherein the slide member is non-rotatable relative to the differential mechanism both when the differential apparatus is in the coupled state and when the differential apparatus is in the uncoupled state.

2. The differential apparatus according to claim 1, wherein
an annular ring gear is fixed to an outer periphery of the other end portion of the cylindrical portion in the axial direction in the second case member, and the second case member has the second meshing portion on the bottom portion side.

3. The differential apparatus according to claim 2, wherein
the second case member integrally has the cylindrical portion, the bottom portion, and the meshing teeth of the second meshing portion.

4. The differential apparatus according to claim 2, wherein
the second case member includes a combination of a main body that integrally has the cylindrical portion and the bottom portion and a separate body that integrally has an engaging portion and the second meshing portion, the engaging portion engaging with the bottom portion of the main body so as to be non-rotatable relative thereto.

5. The differential apparatus according to claim 2, wherein
the clutch mechanism includes a biasing member that biases the slide member in a direction of separating the slide member apart from the bottom portion of the second case member.

* * * * *